US008918479B2

(12) United States Patent
O'Connell et al.

(10) Patent No.: US 8,918,479 B2
(45) Date of Patent: Dec. 23, 2014

(54) USER-BROWSER INTERACTION ANALYSIS AUTHENTICATION SYSTEM

(75) Inventors: Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 920 days.

(21) Appl. No.: 12/126,117

(22) Filed: May 23, 2008

(65) Prior Publication Data

US 2008/0222712 A1 Sep. 11, 2008

Related U.S. Application Data

(63) Continuation of application No. 11/279,186, filed on Apr. 10, 2006, now abandoned.

(51) Int. Cl.
*G06F 15/16* (2006.01)
*G06F 15/173* (2006.01)
*G06F 21/55* (2013.01)

(52) U.S. Cl.
CPC ..................................... *G06F 21/55* (2013.01)
USPC ........... 709/218; 709/203; 709/217; 709/219; 709/223; 709/224; 709/225; 709/227; 709/228; 709/229; 709/249

(58) Field of Classification Search
USPC ......... 709/203, 217–219, 223–225, 227–229, 709/249
See application file for complete search history.

(56) References Cited

U.S. PATENT DOCUMENTS

| 6,028,950 A | 2/2000 | Merjanian |
| 6,148,094 A | 11/2000 | Kinsella |

(Continued)

FOREIGN PATENT DOCUMENTS

| GB | 02456864 A | 7/2009 |
| WO | 02082214 A2 | 10/2002 |

(Continued)

OTHER PUBLICATIONS

Sergio Tenreiro de Magalhaes, Kenneth Revett and Henrique M.D. Santos, Password Secured Sites-Stepping Forward with Keystrokes Dynamics, Aug. 22-26, 2005, IEEE Computer Society, pp. 1-6.*

(Continued)

*Primary Examiner* — Hieu Hoang
*Assistant Examiner* — Angela Widhalm
(74) *Attorney, Agent, or Firm* — Patents on Demand P.A.; Brian K. Buchheit; Scott M. Garrett

(57) ABSTRACT

Systems, methods and media for authenticating a user based on user-browser interaction are disclosed. Embodiments of a method may include, during an e-commerce session with a user, receiving a request for an action from the user and determining whether the requested action requires additional authentication. Embodiments may also include requesting analysis of user-browser interaction for the session, receiving a pattern matching score for the session, and performing an action based on the pattern matching score and the requested action. The pattern matching score may provide an indication of a comparison between the user's interaction with a browser during the session and a user-browser interaction profile for the user. The performed action may include completing an e-commerce transaction, accessing or modifying information, changing a password, requesting additional information, denying the requested action, or other action. Further embodiments may provide for authenticating the user with a first-level authentication.

20 Claims, 7 Drawing Sheets

(56) References Cited

U.S. PATENT DOCUMENTS

| | | |
|---|---|---|
| 6,182,076 B1 | 1/2001 | Yu et al. |
| 6,304,915 B1 | 10/2001 | Nguyen et al. |
| 6,668,327 B1 | 12/2003 | Prabandham et al. |
| 6,904,408 B1* | 6/2005 | McCarthy et al. .............. 705/2 |
| 6,941,340 B2 | 9/2005 | Kim et al. |
| 7,383,570 B2 | 6/2008 | Pinkas et al. |
| 7,552,199 B2* | 6/2009 | Pomerantz ................ 709/219 |
| 7,613,659 B1* | 11/2009 | Hoffman et al. .............. 705/44 |
| 7,613,685 B2* | 11/2009 | Jaepel et al. ....................... 1/1 |
| 7,693,863 B2* | 4/2010 | Martin et al. ................ 707/603 |
| 7,813,822 B1 | 10/2010 | Hoffberg |
| 7,873,595 B2 | 1/2011 | Singh et al. |
| 7,975,025 B1* | 7/2011 | Szabo et al. .................. 709/218 |
| 8,032,483 B1 | 10/2011 | Haveliwala et al. |
| 2001/0042045 A1 | 11/2001 | Howard et al. |
| 2002/0065912 A1* | 5/2002 | Catchpole et al. ........... 709/224 |
| 2002/0099649 A1 | 7/2002 | Lee |
| 2002/0112048 A1* | 8/2002 | Gruyer et al. ................ 709/224 |
| 2002/0178257 A1* | 11/2002 | Cerrato ......................... 709/224 |
| 2003/0159070 A1* | 8/2003 | Mayer et al. ................ 713/201 |
| 2004/0015714 A1* | 1/2004 | Abraham et al. ............ 713/200 |
| 2004/0034794 A1* | 2/2004 | Mayer et al. ................ 713/200 |
| 2004/0230495 A1* | 11/2004 | Lotvin et al. .................... 705/26 |
| 2004/0250115 A1 | 12/2004 | Gemmel et al. |
| 2005/0008148 A1 | 1/2005 | Jacobson et al. |
| 2005/0050366 A1 | 3/2005 | Kwok et al. |
| 2005/0154676 A1 | 7/2005 | Ronning et al. |
| 2006/0212407 A1 | 9/2006 | Lyon |
| 2006/0282660 A1* | 12/2006 | Varghese et al. ............. 713/155 |
| 2006/0287963 A1 | 12/2006 | Steeves |
| 2007/0023672 A1 | 2/2007 | Sellmair |
| 2007/0073579 A1 | 3/2007 | Immorlica et al. |
| 2007/0239604 A1 | 10/2007 | O'Connell et al. |
| 2007/0240230 A1 | 10/2007 | O'Connell |
| 2011/0082763 A1* | 4/2011 | Leite et al. .................. 705/26.7 |
| 2012/0054005 A1 | 3/2012 | Manning |
| 2012/0198489 A1 | 8/2012 | O'Connell |
| 2012/0198491 A1 | 8/2012 | O'Connell |
| 2012/0204257 A1 | 8/2012 | O'Connell |
| 2013/0030936 A1 | 1/2013 | Aidasani |
| 2013/0254139 A1* | 9/2013 | Lei ................................. 706/11 |
| 2014/0019542 A1* | 1/2014 | Rao et al. ..................... 709/204 |
| 2014/0164178 A1* | 6/2014 | Adjaoute ................... 705/26.35 |

FOREIGN PATENT DOCUMENTS

| | | |
|---|---|---|
| WO | 02082214 A3 | 10/2002 |
| WO | WO 02/082214 A2 | 10/2002 |
| WO | WO02082214 A2 | 10/2002 |

OTHER PUBLICATIONS

Globalsecurity.org, "Biometrics: Hand Geometry and Handwriting," http://www.globalsecurity.org/security/systems/hand.htm, Apr. 27, 2005, pp. 3.

Tsan-Yu J. Huang, Final Office Action: mail date Jul. 7, 2009; published by the USPTO in utility U.S. Appl. No. 11/279,202, pp. 15.

Tsan-Yu J. Huang, Non-Final Office Action: mail date Jan. 23, 2009; published by the USPTO in utility U.S. Appl. No. 11/279,202, pp. 14.

Yanet Rodriguez, Non-Final Office Action: mail date Apr. 14, 2009; published by the USPTO in utility U.S. Appl. No. 11/279,186, pp. 21.

S J Shepherd, "Continuous Authentication by Analysis of Keyboard Typing Characteristics," European Convention on Security & Detection, May 16-18, 1995, Conference Pub No. 408 © IEE 1995, pp. 111-114.

International Search Report; International App No. PCT/EP2007/051950, mail date: Nov. 7, 2007; pp. 2.

Yanet Rodriguez, USA.

Tsan-Yu J. Huang, USA.

Pepperdine, Kirk. "The Ajax Effect on Server Load".www.theserverside.com 2005.

Cioroianu, Andre. "Enabling Data Exchange in Ajax Applications". Oracle Technology Network, 2006.

U.S. Appl. No. 13/444,465; Final Rejection; Jun. 26, 2014.

U.S. Appl. No. 13/444,465; Non-final Rejection; Oct. 4, 2013.

U.S. Appl. No. 11/279,202; Notice of Allowance and Fees Due; Sep. 27, 2013.

U.S. Appl. No. 11/279,202; Non-final Rejection; Feb. 20, 2013.

U.S. Appl. No. 13/447,848; Non-final Rejection; Oct. 7, 2013.

U.S. Appl. No. 13/447,848; Non-final Rejection; Nov. 26, 2012.

* cited by examiner

USER-BROWSER INTERACTION ANALYSIS AUTHENTICATION SYSTEM

CROSS-REFERENCES TO RELATED APPLICATIONS

Pursuant to 35 USC §120, this continuation application claims priority to and benefit of U.S. patent application Ser. No. 11/279,186, entitled "USER-BROWSER INTERACTION ANALYSIS AUTHENTICATION SYSTEM", filed on Apr. 10, 2006, the disclosure of which is incorporated herein in its entirety for all purposes.

FIELD OF INVENTION

The present invention is in the field of data processing systems and, in particular, to systems, methods and media for authenticating a user based on analysis of user-browser interaction, such as for providing authentication for an Internet or e-commerce transaction.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM or DVD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. The use of mobile computing devices, such as notebook PCs, personal digital assistants (PDAs), sophisticated wireless phones, etc., has also become widespread. Mobile computing devices typically exchange some functionality or performance when compared to traditional PCs in exchange for smaller size, portable power, and mobility.

The widespread use of PCs and mobile computing devices in various segments of society has resulted in a reliance on computer systems both at work and at home, such as for telecommuting, news, stock market information and trading, banking, shopping, shipping, communication in the form of hypertext transfer protocol (http) and e-mail, as well as other services. Many of these functions take advantage of the communication abilities offered by the Internet or other networks, such as local area networks. One function that continues to grow in importance is Internet-based commerce (also known as e-commerce or on-line commerce) where consumers purchase goods or services from businesses via an Internet connection. Typically, a consumer may utilize a browser or other interface on their PC or other device to select a product or service for purchase from a website (i.e., e-commerce site) operated by the business. While Internet commerce continues to dramatically rise in importance to both businesses and consumers, fraudulent behavior slows adoption of Internet commerce and costs both businesses and consumers time, money, and other resources. Hackers conduct Internet fraud by hijacking accounts (i.e., stealing account information) and performing tasks with the stolen account information, improperly acquiring goods, services, or money. Hackers can hijack accounts by many methods, including "phishing" (fraudulently acquiring account information by pretending to be a trustworthy source), spyware, insider information, compromised data sources at the commerce location, or other methodologies.

Many solutions have been developed for Internet commerce fraud by businesses, browser developers, and others to prevent Internet commerce fraud, but all have failed to provide an effective and efficient solution. One type of authentication is to require a user id and password to complete a transaction, but such authentication by itself is subject to hijacking by the means described previously. One known solution is to require a security code (a three or four digit non-imprinted number on a credit card) with every on-line purchase in addition to password authentication, but this solution provides no protection for phishing as the code will typically be entered during the phishing process along with other account information. Another solution is to also require operator 'call back' to authenticate the purchaser, but phone numbers can be quickly setup and taken down with no audit trail with Voice over Internet Protocol (VoIP) accounts, especially if a VoIP account is hijacked. Moreover, this solution significantly increases the expense to businesses as it requires a live person to make phone calls. Customer satisfaction is also reduced with this solution as the customer must be near a phone to receive a call back and, for purchased goods, is not treated to the instant satisfaction of their purchase. There is, therefore, a need for an efficient and effective system to provide additional authentication of users during an Internet commerce transaction.

SUMMARY OF THE INVENTION

The problems identified above are in large part addressed by systems, methods and media for authenticating a user based on user-browser interaction. Embodiments may include, during an e-commerce session with a user, receiving a request for an action from the user and determining whether the requested action requires additional authentication. Embodiments may also include, in response to determining that the requested action requires additional authentication, requesting analysis of user-browser interaction for the session and receiving a pattern matching score for the session. The pattern matching score may provide an indication of a comparison between the user's interaction with a browser during the session and a user-browser interaction profile for the user. Embodiments may also include performing an action based on the pattern matching score and the requested action. The performed action may include, for example, completing an e-commerce transaction, accessing restricted information, modifying user information, changing a password for the user, requesting additional information, or denying the requested action. Further embodiments may provide for authenticating the user with a first-level authentication or establishing the e-commerce session with the user. A further embodiment may provide for analyzing the pattern matching score before performing the action based on the pattern matching score and the requested action. In another further embodiment, receiving the pattern matching score may include determining the pattern matching score for the session. In another further embodiment, determining the pattern matching score may include determining user-browser interaction data associated with the session and comparing the data to determined patterns in previous interaction data. In yet another embodiment, performing the action may include one or more of completing an e-commerce transaction, accessing restricted information, modifying user information, changing a password for a user, requesting additional information, or denying the requested action.

Another embodiment provides a machine-accessible medium containing instructions effective, when executing in a data processing system, to cause the system to perform a series of operations for authenticating a user based on user-browser interaction. The series of operations generally includes, during an e-commerce session with a user, receiving a request for an action from the user and determining whether the requested action requires additional authentication. The series of operations may also include, in response to determining that the requested action requires additional authentication, requesting analysis of user-browser interaction for the session and receiving a pattern matching score for the session. The series of operations may also include performing an action based on the pattern matching score and the requested action.

A further embodiment provides an e-commerce authentication system having an application server in communication with an incoming interaction server and a pattern matching server. The application server may include an e-commerce application to establish a session with a user of a client computer system. The e-commerce application may determine that additional authentication is required in response to a request by the user for an action. The application server may also include a pattern matching requester to request analysis of user-browser interaction for the established session and to receive a pattern matching score for the established session. The e-commerce application may perform an action based on the pattern matching score for the established session and the requested action. The system may also include an incoming interaction server having a session data listener to receive user-browser interaction data from one or more client computer systems, an interaction data manager to associate received user-browser interaction data with a user login, and an interaction database interface to store the user-browser interaction and associated information in a user-browser interaction database. The system may also include a pattern matching server having an application server interface to receive a request for a pattern matching score and to transmit a determined pattern matching score to the application server, an interaction database interface to access stored user-browser interaction data, and an interaction data analyzer to analyze the stored user-browser interaction data associated with the session for patterns and to compare the determined patterns to user-browser interaction data associated with the session to determine a pattern matching score for the session.

Another embodiment provides a method for processing user-browser interaction data for an e-commerce session. Embodiments may include, during an e-commerce session with a user, receiving user-browser interaction data from a client computer system and associating the received user-browser interaction data with a user login for the session. Embodiments may also include storing the user-browser interaction data and associated information in a user-browser interaction database, where the associated information includes an indication of the user login for the session. In a further embodiment, associating the received user-browser interaction data with a user login may also include associated the received data with a user-browser interaction profile associated with the user.

Another embodiment provides a method for determining a pattern matching score for an e-commerce session. Embodiments may include determining user-browser interaction data associated with a current session and accessing user-browser interaction data associated with previous session for a user associated with the current session and analyzing the previous session user-browser interaction data to determine patterns in the previous session user-browser interaction data. Embodiments may also include determining a pattern matching score for the current session, such as by comparing user-browser interaction data for the current session with the determined patterns.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

Figure 1:
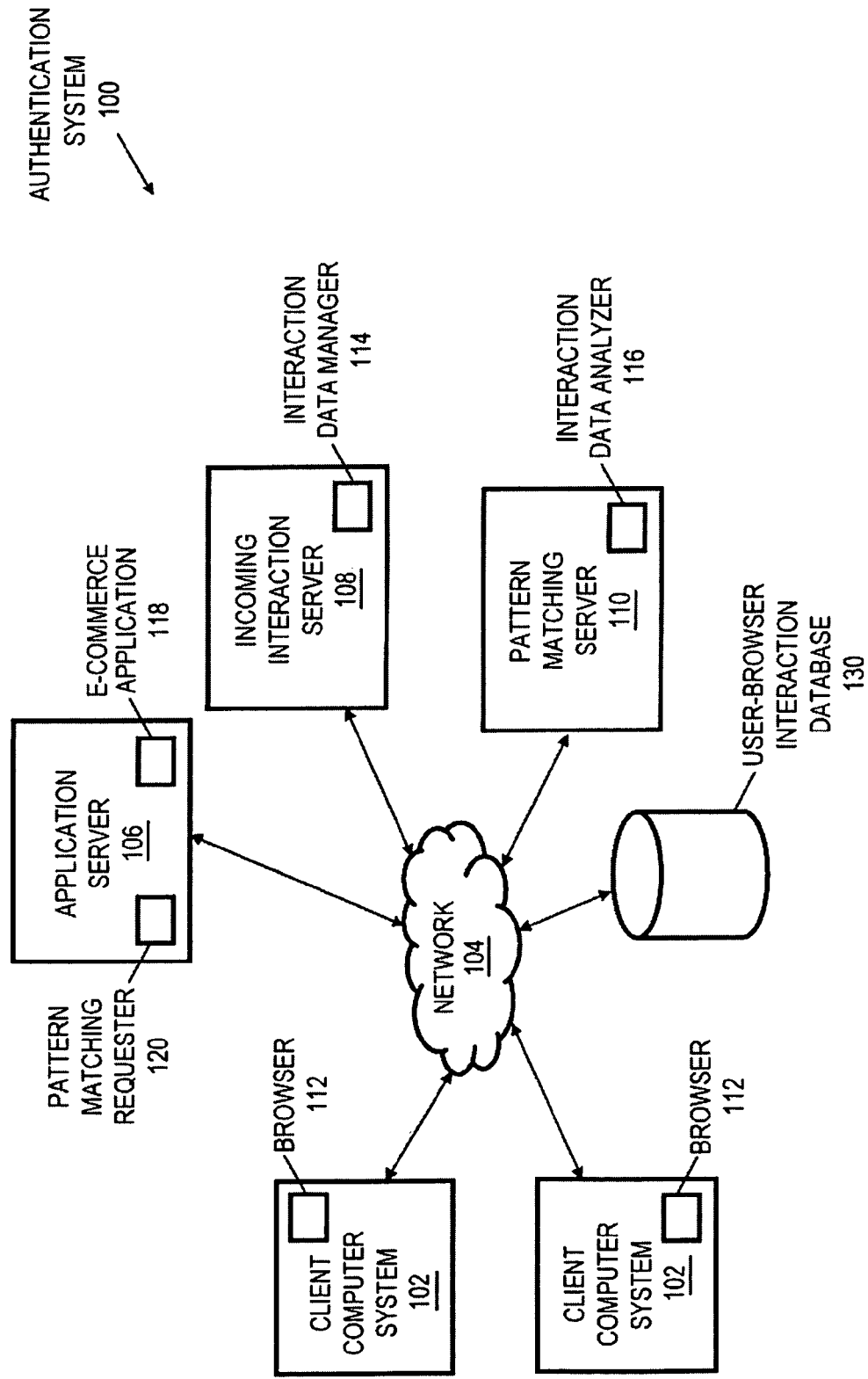
FIG. 1 depicts an environment for an e-commerce authentication system with an application server, incoming interaction server, and pattern matching server according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for authenticating a user based on user-browser interaction are disclosed. Embodiments of a method may include, during an e-commerce session with a user, receiving a request for an action from the user and determining whether the requested action requires additional authentication. Embodiments may also include, in response to determining that the requested action requires additional authentication, requesting analysis of user-browser interaction for the session and receiving a pattern matching score for the session. The pattern matching score may provide an indication of a comparison between the user's interaction with a browser during the session and a user-browser interaction profile for the user. Embodiments may also include performing an action based on the pattern matching score and the requested action. The performed action may include, for example, completing an e-commerce transaction, accessing restricted information, modifying user information, changing a password for the user, requesting additional information, or denying the requested action. Further embodiments may provide for authenticating the user with a first-level authentication.

The system and methodology of the disclosed embodiments allows for unobtrusive, authentication for a user during an e-commerce (Internet) transaction by comparing the user's interaction with their browser with an existing profile of the user's previous interaction with their browser by generation of a pattern matching score. The user's interaction may include attributes such as the speed of selecting keys, the method the user utilizes to move between fields (e.g., mouse, tab key, etc.), or any other aspect of the user's browser interaction. Based on the pattern matching score, an e-commerce application may then allow a transaction, reject the transaction, or perform other actions. The disclosed methodology may be particularly useful as a secondary authentication mechanism in a two-factor authentication system, providing additional authentication strength to a primary authentication mechanism such as a user name and password. Internet commerce fraud may advantageously be reduced by rejection of e-commerce transactions where the pattern matching score indicates that the user is not requesting the transaction, as may happen when user credit card or other information is stolen or otherwise compromised. The disclosed method may be relatively unobtrusive and operate without knowledge of the user or required action by the user, providing an effective and efficient authentication mechanism.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Each software program described herein may be operated on any type of computer, such as personal computer, server, etc. Any programs may be contained on a variety of media. Illustrative media include, but are not limited to: (i) information permanently stored on non-writable storage media (e.g., read-only memory devices within a computer such as CD-ROM disks readable by a CD-ROM drive) and (ii) alterable information stored on writable storage media (e.g., floppy disks within a diskette drive or hard-disk drive).

Turning now to the drawings, FIG. 1 depicts an environment for an e-commerce authentication system with an application server, incoming interaction server, and pattern matching server according to one embodiment. In the depicted embodiment, the e-commerce authentication system 100 includes a plurality of client computer systems 102 in communication with a network 104. The disclosed e-commerce authentication system 100 also includes an application server 106, an incoming interaction server 108, and a pattern matching server 110 all in communication with network 104. Users may utilize a browser 112 executing on a client computer system 102 to interact with an e-commerce application 118 of an application server 106 via network 104 by establishing a session with the e-commerce application 118. The incoming interaction server 108 may receive indications of the interaction between the user and browser 112 for storage in a user-browser interaction database 130 during operation of the browser 112 by the user. If the e-commerce application 118 determines that additional authentication of a user is required to perform a requested action, the application server 106 may request a pattern matching score from the pattern matching server 110. The pattern matching server 110 may then determine a pattern matching score based on the user's browser 112 interaction during the current session and detected patterns stored in the user-browser interaction database 130 from previous sessions. Based on the pattern matching score and the requested action from the user, the e-commerce application 118 may authenticate the user and allow the requested action, request additional information, or deny the transaction. The e-commerce application 118 may thus utilize the pattern matching score to authenticate the user or provide additional authentication strength to another primary form of authentication, such as a user name and password.

Client computer systems 102 may each include one or more personal computers, workstations, servers, mainframe computers, notebook or laptop computers, desktop computers, PDAs, set-top boxes, mobile phones, wireless devices, or the like. In some embodiments, client computer system 102 may be a computer system as described in relation to FIG. 2 and may be in wired or wireless communication with network 104. Browser 112 may be a graphical browser application that allows a user to view Internet or intranet content such as Microsoft Corporation's Internet Explorer™, Netscape Communication Corporation's Navigator™, Mozilla Foundation's Mozilla, Apple Corporation's Safari™, etc. Browsers, at their most basic level of operation, permit users to connect to a given network site, download informational content from that site, and display that information to the user. To view additional information, the user designates a new network address (such as by selecting a link) whose contents then replace the previously displayed information on the user's computer display. Using a browser 112, a user may interact with an e-commerce application 118 to perform tasks such as purchasing goods or services, requesting or viewing information, providing information, or other tasks. A user may interact with the browser 112 via user input devices of the client computer system 102 such as a mouse, keyboard, voice input device, etc., as will be described in more detail subsequently.

As will be described in more detail subsequently, the client computer system 102 may transmit indications of the user's interaction with the browser to the incoming interaction server 108 via network 104 to facilitate determination of a user-browser interaction profile and pattern matching score. The user-browser interaction data transmitted by the client computer system 102 may include both indications of the user-browser interaction as well as identification information. In some embodiments, the browser 112 may be enabled with JavaScript™ (of Sun Microsystems, Inc.) or other code that enables transmission of interaction details from a client to a server. JavaScript™ is a system of programming codes that can be embedded in Hypertext Markup Language (HTML) language or other language of a page to provide additional functionality and is generally supported by modern browsers 112. In these embodiments, the client software may be included as JavaScript on every page sent by the application server 106. The JavaScript™ code may track details of the user's interaction with the browser 112 and transmit an indication of such interaction (as part of the user-browser interaction data) to the incoming interaction server 108. Using Asynchronous JavaScript And XML (AJAX) (also known as XMLHTTP), a Web development technique for creating interactive Web applications that is based on JavaScript™, user-browser interaction details may be transmitted in near-real-time to a specified server (i.e., the incoming interaction server 108). The browser 112 of the client computer system 102 will require compatibility with the scripting language used by e-commerce application 118. While the embodiments herein are described in relation to JavaScript™ and AJAX, one of ordinary skill in the art will recognize that other scripting languages or methodologies may also be utilized with the disclosed system.

As discussed previously, user-browser interaction data may include both indications of interactions between the user and browser 112 as well as identification information relating to the riser and/or client computer system 102. User interactions with a browser 112 may be classified into general categories such as keyboard interactions, movement device interactions, and navigation/selection tendencies. Keyboard interactions may include interactions of a user with the keyboard, including key-down time (how long a particular key is pressed), typing rate, time between keystrokes, numeric keypad usage, capitalization keystroke sequences, common typing errors, etc. A particular user, for example, may typically hold down the 'o' key for milliseconds less time than she holds down the 'k' key, a pattern that may emerge consistently over continued data entry. This particular difference may reflect both hardware differences (e.g., the keyboard spring for each key on a particular keyboard) as well as the user's natural or learned typing pattern. A different user may have a larger gap between the two letters, a smaller gap, no gap, or a reversal of the longer hold time, providing a characteristic that potentially distinguishes the two users. While one such characteristic may generally be insufficient for authentication purposes, an aggregation of different behaviors provides increasing authentication strength as more data is collected and more factors are considered.

Other types of user-browser interaction are also possible. Movement device (e.g., mouse, trackball, etc) interactions may include 'mouse-over' time before clicking, which buttons of a device are used, whether the scroll wheel is used, whether the user holds the cursor steady or fidgets with the cursor, whether the user follows the text with the cursor during reading, etc. Navigation and selection tendencies may include factors relating to how a user navigates a website or selects actions on a website, including scrolling methods (e.g., mouse wheel, arrow keys, left-click on up or down scroll buttons, page up/page down, etc.), whether the user uses 'hot keys' or selects actions from pull-down menus, error correction methods (e.g., highlighting text to be replaced with mouse or keyboard, using delete key, accepting spell-checker recommendations, etc.), where the user positions the cursor during screen loading, how the user navigates between fields (e.g., tab key, mouse, etc.), textbox submit preference (e.g., select, 'enter' or use the mouse to select submit), etc. While a number of general categories and specific examples are described herein, one skilled in the art will recognize that any type of indication of the interaction of a user and a browser 112 and the site displayed on the browser 112 may be used. The details of a user's interaction while using a website may, particularly in combination, identify a user by their behavior to some degree. With enough user-browser interaction detail, the identification may become highly accurate and sufficient for authentication purposes (either solely or as a supplement to a primary form of authentication).

Identification information included within the user-browser interaction data may include any information that serves to assist in identifying the user, browser 112, and/or client computer system 102, such as browser code name, browser major version, browser minor version, CPU class, platform, user agent, system language and cookies.

Network 104 may be any type of data communications channel or combination of channels, such as the Internet, an intranet, a LAN, a WAN, an Ethernet network, a wireless network, a proprietary network, or a broadband cable network. The Internet or other public network may be particularly useful as network 104 when the client computer systems 102 are widely distributed from the application server 106 as communications between these systems will be facilitated. Similarly, a corporate intranet may serve as network 104 for communications with an internal corporate computing environment. Those skilled in the art will recognize, however, that the invention described herein may be implemented utilizing any type or combination of data communications channel(s).

Application server 106 may be a server computer dedicated to running particular software applications such as e-commerce applications 118, business applications, or databases. An application server 106 typically has built-in redundancy, high performance, and support for complex database access. Application server 106 may meet standards such as Java Platform, Enterprise Edition (Java EE™, formerly known as J2EE™) by Sun Microsystems, Inc. An example application server is International Business Machine's (IBM®'s) WebSphere® Application Server (WAS) that may serve as middleware to set up, operate, and integrate e-business applications across multiple computing platforms using Web technologies.

Application server 106 may include one or more e-commerce applications 118 and a pattern matching requester 120. An e-commerce application 118 (which may include one or more back-end applications, such as for inventory, billing, accounting, etc) may be any application that may be used to provide services, content, or information to a user at a remote client computer system 102, including applications that facilitate purchase of goods or services by users or access to information by users. The pattern matching requester 120 may transmit requests to the pattern matching server 110 for a pattern matching score 110 via network 104 and may receive pattern matching scores from the pattern matching server 110. The pattern matching requester 120 may also, in conjunction with an e-commerce application 118, analyze the pattern matching score to determine an appropriate course of action to handle a user request for an action. The e-commerce application 118 may, for example, allow the action, deny the action, mark the transaction for later follow-up, flag the transaction as one that cannot complete until further verification, request additional authentication information, etc. The user request for an action may include requesting completion of tasks such as an e-commerce transaction, accessing restricted information, modifying user information, or changing a password for the user. The pattern matching requester 120 may be a separate module from e-commerce application 118 or may be integrated into an e-commerce application 118. A separate pattern matching requester 120 may potentially serve multiple e-commerce applications 118.

As described previously, the incoming interaction server 108 may receive indications of the interaction between the user and browser 112 for storage in a user-browser interaction database 130 during operation of the browser 112 by the user, providing for processing of user-browser interaction data. The application server 106 may include JavaScript™ or other script directing user-browser interaction information gathered at a client computer system 102 to be directed to a particular incoming interaction server 108. The incoming interaction server 108 may then store received user-browser interaction data in a user-browser interaction database 130.

Before storing the user-browser interaction data, an interaction data manager 114 of the incoming interaction server 108 may associate the data with a particular user login for later access and analysis. Additionally, the interaction data manager 114 may associate received data with a particular profile for the user. A user-browser interaction profile for a user may indicate interaction tendencies that are specific to a particular piece of interaction hardware. A user may have multiple user-browser interaction profiles each representing, for example, a different client computer system 102 they may use to access an e-commerce application 118. A user may interact differently with a browser from a home computer instead of a work computer, in one example, if one of the computers does not have a mouse with a scroll wheel. A user's style may change along with interaction hardware, such as because different options are available, different components have different performances, or for psychological reasons. The differences in hardware can be enough to produce an entirely different user-interaction experience. As each user will likely only have one account at the e-commerce application 118 website, multiple user-browser interaction profiles for a particular login provide flexibility to accommodate different user-browser interaction scenarios. The incoming interaction server 108 may effectively 'map' the user's interaction to the appropriate device. To identify the hardware the user is currently using, the incoming interaction server 108 may utilize information such as cookies, IP address subnet, browser code name, browser full name, browser major version, browser minor version, CPU class, platform, user agent, and system language. These items may not be weighted equally or ail considered, and some may only have a positive weighting associated with them (such as IP subnet).

The pattern matching server 110 may determine a pattern matching score based on the user's browser 112 interaction during the current session and detected patterns in the user-browser interaction data for the user that are stored in the user-browser interaction database 130. Upon receiving a request for a pattern matching score for a particular user from an e-commerce application 118, the pattern matching server 110 may access the stored user-browser interaction data for that user, analyze the stored data for patterns, and compare the patterns to the user-browser interaction data for the current session. The user-browser interaction data for the current session may, in some embodiments, be stored in the user-browser interaction database 130. The result of the comparison and analysis may be a pattern matching score for the session based on the previous user-browser interactions. The pattern matching score may be any indication of the likelihood that the person (or entity) acting as the user of the current session is in fact the actual user. The pattern matching server 110 may transmit the determined pattern score to the requesting e-commerce application 118, which may in turn determine its course of action based at least in part on the pattern matching score. A pattern matching score indicating high authenticity strength, for example, may suggest to the e-commerce application 118 that the user has been authentication while a pattern matching score indicating low authenticity may result in denial of a transaction to the user or a request for additional information.

Application server 106, incoming interaction server 108, and pattern matching server 110 may each include one or more personal computers, workstations, servers, mainframe computers, notebook or laptop computers, desktop computers, or other computer systems. In some embodiments, any of the application server 106, incoming interaction server 108, and pattern matching server 110 may be a computer system as described in relation to FIG. 2 and each may be in wired or wireless communication with network 104. An example application server 106, incoming interaction server 108, and pattern matching server 110 may be an International Business Machine Corporation (IBM) EServer® server. In the e-commerce authentication system 100, the application server 106, incoming interaction server 108, and pattern matching server 110 may be located at the same location, such as in the same building or computer lab, or could be remote. While the term "remote" is used with reference to the distance between the components of the e-commerce authentication system 100, the term is used in the sense of indicating separation of some sort, rather than in the sense of indicating a large physical distance between the systems. For example, any of the components of the e-commerce authentication system 100 may be physically adjacent or located as part of the same computer system in some network arrangements.

The user-browser interaction database 130 may be any type of volatile or non-volatile storage and may store user-browser interaction data received by an incoming interaction server 108, as well as associated or identifying information. The user-browser interaction database 130 may be a stand-alone unit or be integrated into another component of the e-commerce authentication system 100 such as the incoming interaction server 108 or the pattern matching server 110.

The systems and methodologies of the disclosed embodiments provide an efficient and effective mechanism to provide authentication of a user for an e-commerce transaction. The disclosed system may operate without notification of the user in some embodiments to provide a seamless and efficient authentication method. By tracking a user's interaction with a browser over multiple sessions, a user's actions in a new session can be compared to patterns that emerged in the earlier sessions to provide a type of authentication. The user-browser interaction authentication may serve as a supplement to another type of authentication (a secondary form of authentication), such as a user name and password, in a two-factor authentication system. In some embodiments with sufficiently robust and sophisticated interaction data, user-browser authentication may serve as a sole form of authentication, but may typically be used as secondary authentication. Through the use of user-browser interaction profiles, different interaction styles of the users on different machines may advantageously be accommodated. The disclosed user-browser interaction authentication may be particularly useful for e-commerce applications where user convenience is highly valued and fraud is a significant risk.

Figure 2:
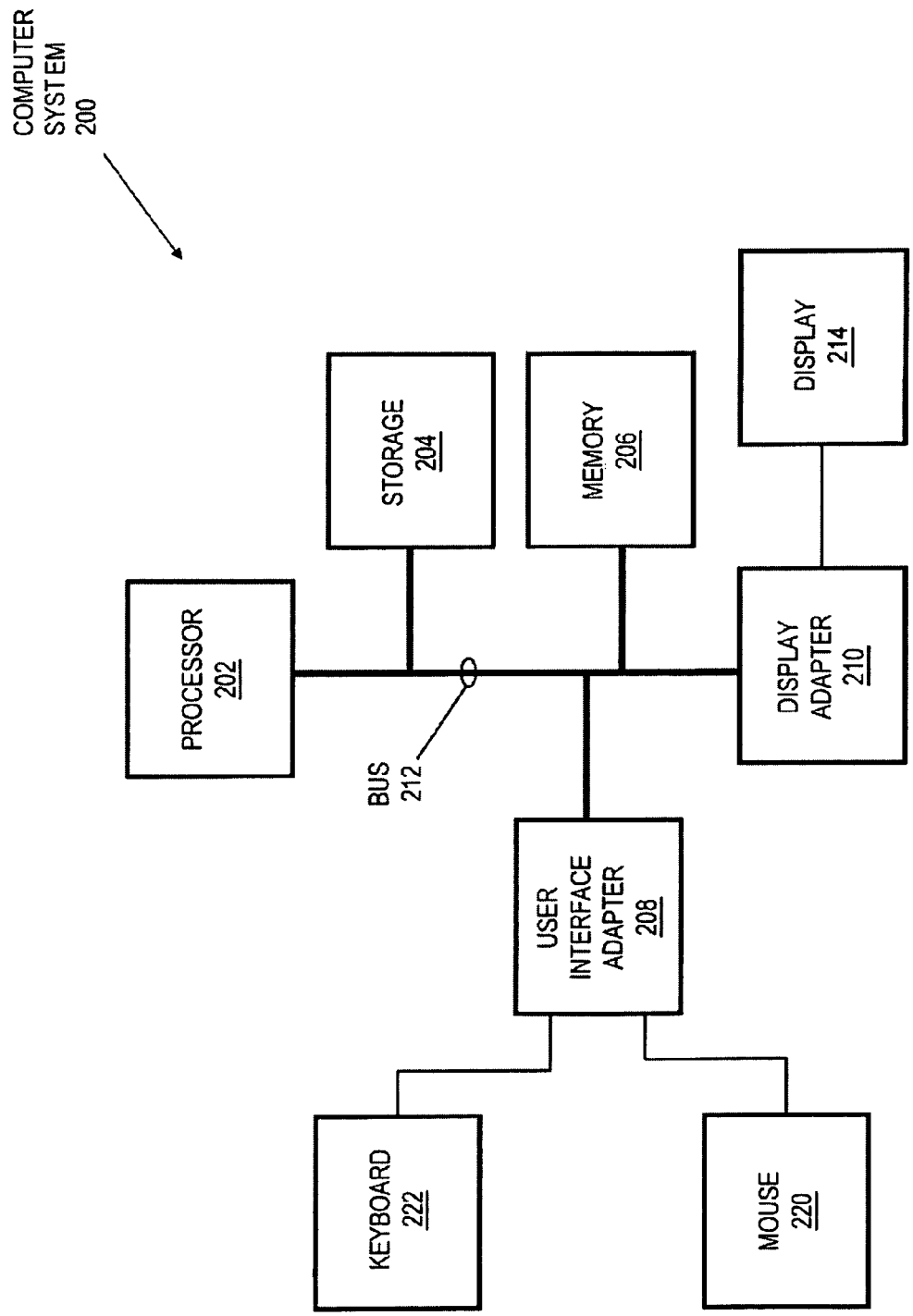
FIG. 2 depicts a block diagram of one embodiment of a computer system suitable for use as a component of the e-commerce authentication system.

FIG. 2 depicts a block diagram of one embodiment of a computer system 200 suitable for use is a component of the e-commerce authentication, system 100, such as a client computer system 102, application server 106, incoming interaction server 108, or pattern matching server 110. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212. The bus 212 facilitates communication between the processor 202 and other components of the computer system 200, as well as communication between components. Processor 202 may include one or more system central processing units (CPUs) or processors to execute instructions, such as an IBM® PowerPC® processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM).

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. For a client computer system 102, a user may utilize the keyboard 222 and mouse 220 to interact with a browser 112 and it is these interactions that may be used to create user-browser interaction data. The bus 212 may also connect the processor 202 to a display, such as an LCD display or CRT monitor, via the display adapter 210.

Figure 3:
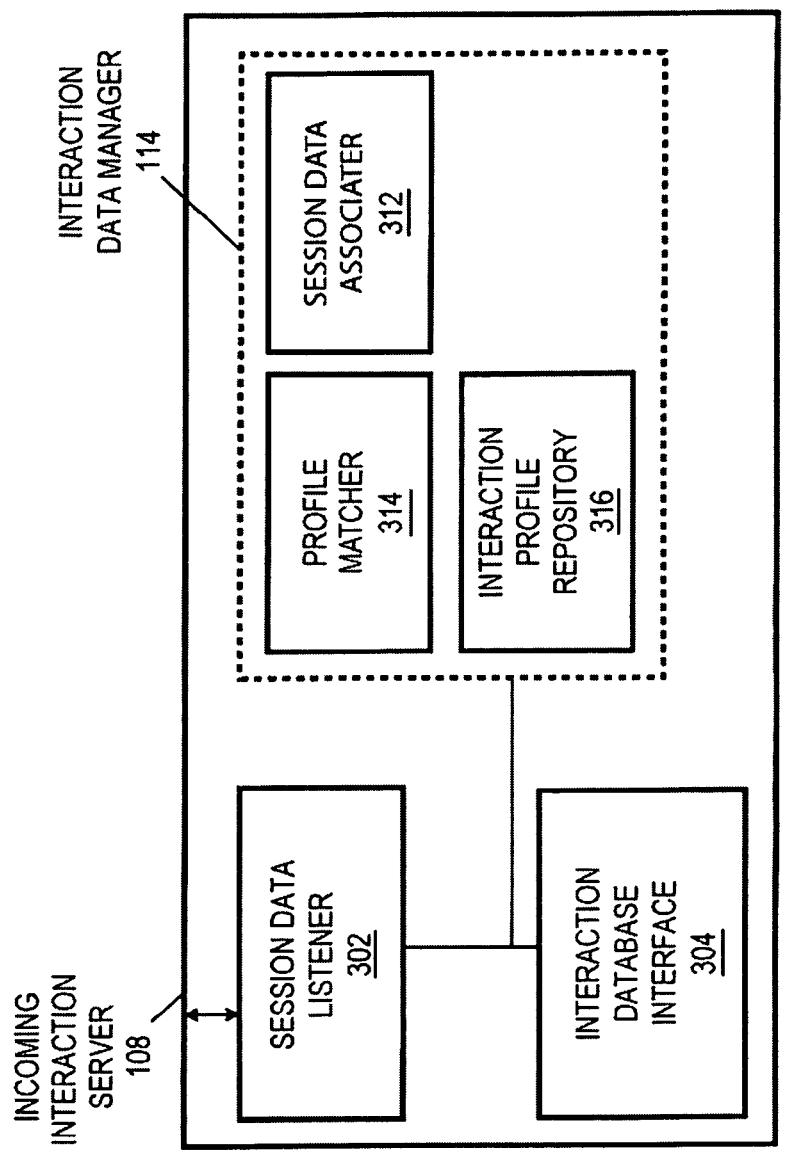
FIG. 3 depicts a conceptual illustration of software components of an incoming interaction server of the e-commerce authentication system according to one embodiment.

FIG. 3 depicts a conceptual illustration of software components of an incoming interaction server 108 of the e-commerce authentication, system 100 according to one embodiment. As described previously (and in more detail in relation to FIG. 5), the incoming interaction server 108 may receive user-browser interaction data from one or more client computer systems 102 and process and store the received data. The incoming interaction server 108 of the depicted embodiment includes an interaction data manager 114, a session data listener 302, and an interaction database interface 304. The session data listener 302 may receive indications of user-browser interactions in the form of user-browser interaction data from client computer systems 102 via network 104. The session data listener 302 may then transmit received data for the interaction data manager 114 for processing. The interaction database interface 304 may store user-browser interaction data or other information in the user-browser interaction database 130 for the incoming interaction server 108 and may serve as the interface between the two components.

The interaction data manager 114 may process received user-browser interaction data and associate the data with a user and/or profile, and may use sub-modules such as a session data associator 312, profile matcher 314, and interaction profile repository 316 to assist it in performing its tasks. The session data associator 312 may associate received user-browser interaction data (from a particular session) with a particular user login. User names, logins, or other information may be contained as part of the user-browser interaction data in some embodiments so that the session data associater 312 may extract user login information from the received data. The profile matcher 314 may provide additional fidelity by further associating, or matching, the received user-browser interaction data with a particular user-browser interaction profile. User-browser interaction profiles may be stored in an interaction profile repository 316. Each user-browser interaction profile may correspond to a particular piece of hardware (i.e., client computer system 102) that the user may utilize to interact with an e-commerce application 118 via browser 112. As discussed previously, a user-browser interaction profile for a user may indicate interaction tendencies that are specific to a particular piece of interaction hardware and a user may have multiple user-browser interaction profiles each representing different client computer system 102 they may use to access an e-commerce application 118.

Figure 4:
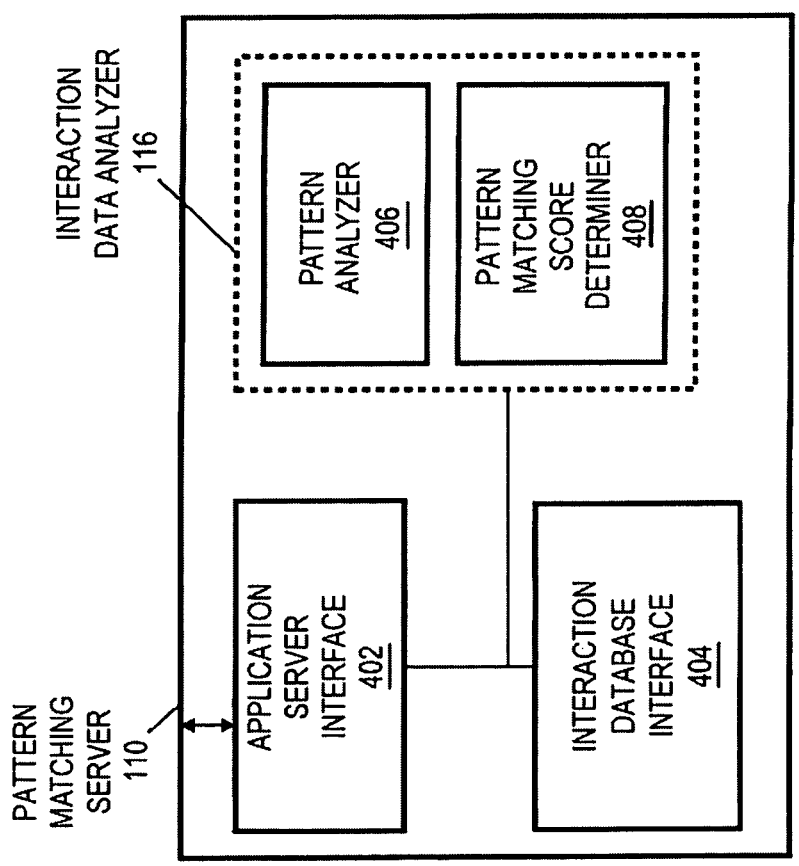
FIG. 4 depicts a conceptual illustration of software components of a pattern matching server of the e-commerce authentication system according to one embodiment.

FIG. 4 depicts a conceptual illustration of software components of a pattern matching server 110 of the e-commerce authentication system 100 according to one embodiment. As described previously (and in more detail in relation to FIG. 6), the pattern matching server 110 may determine a pattern matching score based on the user's browser 112 interaction during the current session and detected patterns in the user-browser interaction data for the user that are stored in the user-browser interaction database 130. The pattern matching server 110 of the depicted embodiment includes an interaction data analyzer 116, an application server interface 402, and an interaction database interface 404. The application server interface 402 may receive requests from an e-commerce application 118 for a pattern matching score for a session and may pass those requests to the interaction data analyzer 116. The application server interface 402 may also receive determined pattern matching scores from the interaction data analyzer 116 and may transmit the scores to the requesting e-commerce application 118. The interaction database interface 404 may, upon request by the interaction data analyzer 116, access user-browser interaction data or other information in the user-browser interaction database 130 and may serve as the interface between the two components.

The interaction data analyzer 116 may determine a pattern matching score based on the user's browser 112 interaction during the current session and detected patterns in the user-browser interaction data for the user that are stored in the user-browser interaction database 130. The interaction data analyzer 116 may include sub-modules such as a pattern analyzer 406 and pattern matching score determiner 408 to assist it in performing its tasks. The pattern analyzer 406 may analyze stored user-browser interaction data for a particular user (and optionally profile), such as for interaction patterns (e.g., user tendencies, habits, etc.). The pattern matching score determiner 408 may, based on the results of the analysis from tire pattern analyzer 406 and the interactions from the user's current session, determine a pattern matching score for the session. To do so, the pattern matching score determiner 408 may compare the current session action with determined patterns to ascertain similarities and differences between them. As discussed previously, the pattern matching score may be any indication of the likelihood that the person (or entity) acting as the user of the current session is in fact the actual user.

Figure 5:
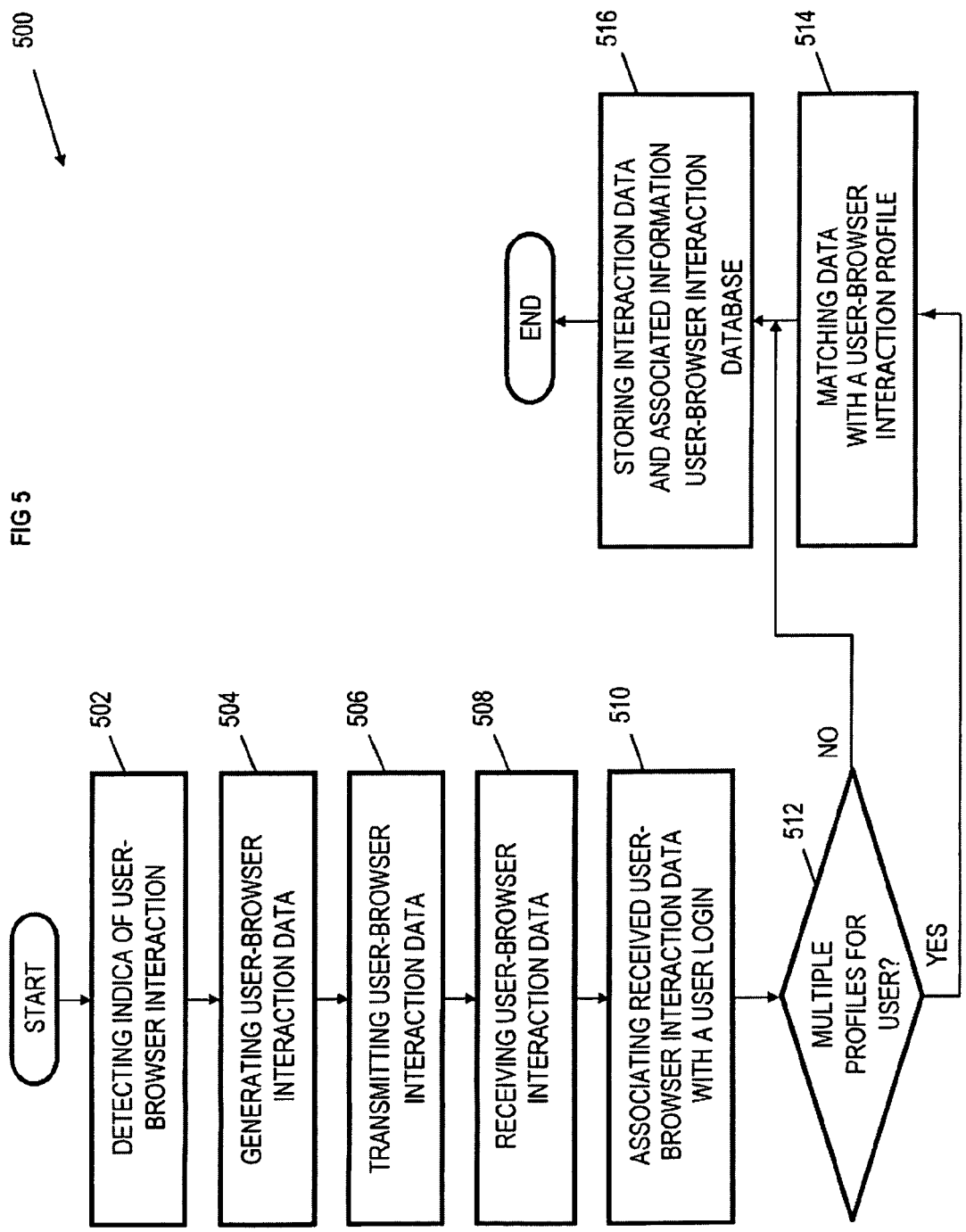
FIG. 5 depicts an example of a flow chart for detecting user-browser interactions and processing user-browser interaction data according to one embodiment.

FIG. 5 depicts an example of a flow chart 500 for detecting user-browser interactions and processing user-browser interaction data according to one embodiment. The method of flow chart 500 may be performed, in one embodiment, by a client computer system 102 and an incoming interaction server 108. Flow chart 500 begins with element 502, where the browser 112 of the client computer system 102 (such as script running on a displayed webpage) detects indicia of user-browser interaction. Element 502 (as well as elements 504 and 506) may execute in a browser 112 when the user accesses a webpage for an e-commerce application 118 that is configured for user-browser interaction-based authentication according to the disclosed embodiments. As indicia of user-browser interactions is gathered, the browser 112 may generate user-browser interaction data based on the indicia at element 504 and transmit the generated user-browser interaction data to a specified incoming interaction server 108 at element 506. The network location of the incoming interaction server 108 may be specified in the JavaScript (or other script) executing on browser 112. The ability to specify particular incoming interaction servers 108 facilitates the use of multiple incoming interaction servers 108 in a single e-commerce authentication system 100.

The incoming interaction server 108 may receive user-browser interaction data from one or more client computer systems 102 at element 508. Via the interaction data manager 114, the incoming interaction server 108 may associate received user-browser interaction data with a particular user login at element 510. Indications of the user login may be stored in the user-browser interaction data or received separately. As described previously, in some embodiments a user may have multiple profiles for their user login associated with different client computer systems 102 they may use to access an e-commerce application 118. If the incoming interaction server 108 determines at decision block 512 that multiple profiles for the user exist, the method of flow chart 500 may continue to element 514, where the profile matcher 314 of the interaction data manager 114 may match the received data with a user-browser interaction profile. The profile matcher 314 may use, for example, an IP address or other identification to differentiate between different user-browser interaction profiles. At element 514, the interaction database interface 304 of the incoming interaction server 108 may store user-browser interaction data and any associated information in the user-browser interaction database 130, after which the method terminates. Associated information may include, for example, an indication of the user login, user-browser interaction profile, or other identification information.

Figure 6:
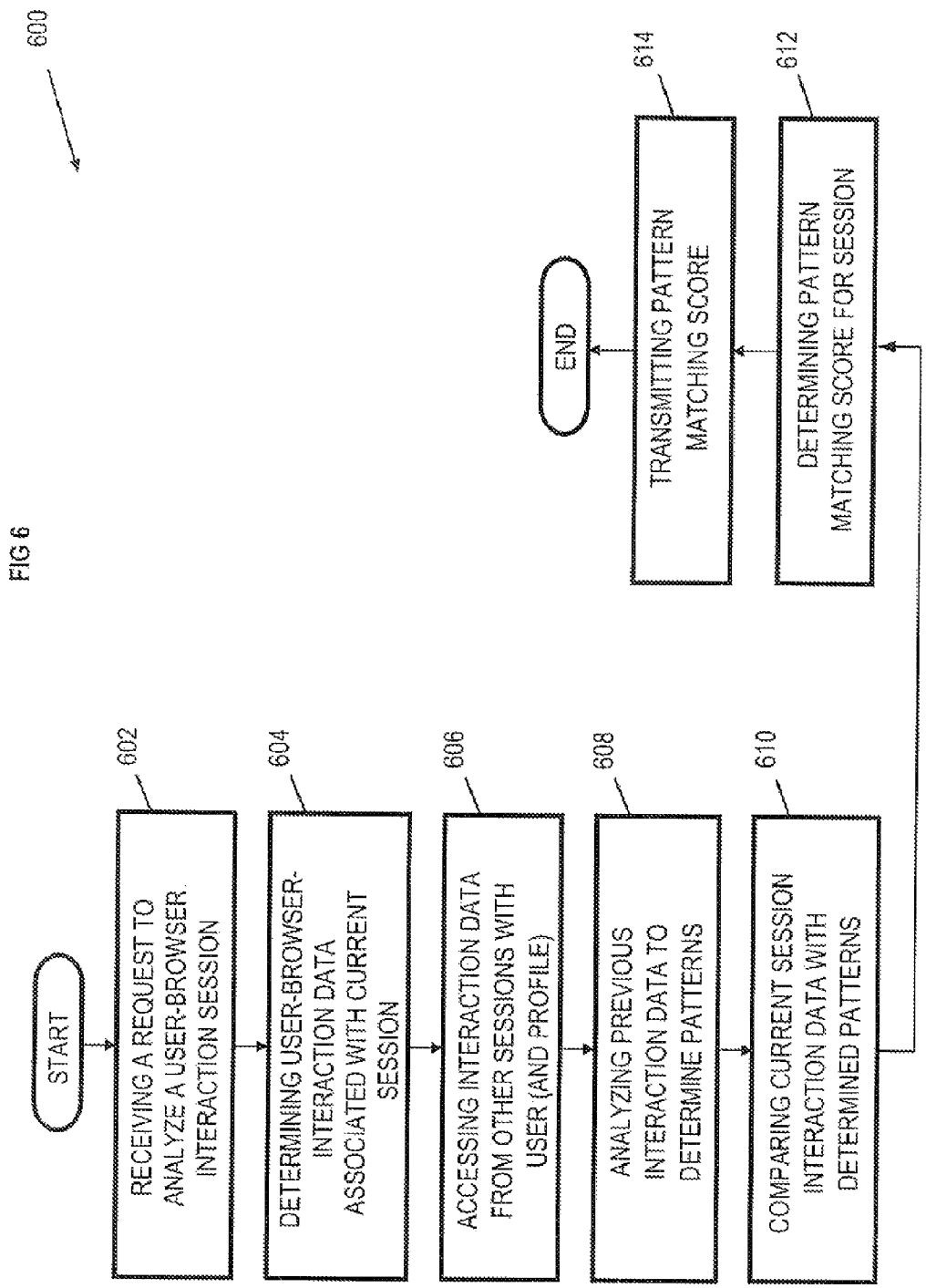
FIG. 6 depicts an example of a flow chart for receiving a request to analyze a user-browser interaction session and to determine a pattern matching score according to one embodiment.

FIG. 6 depicts an example of a flow chart 600 for receiving a request to analyze a user-browser interaction session and to determine a pattern matching score according to one embodiment. The method of flow chart 600 may be performed, in one embodiment, by components of a pattern matching server 110. Flow chart 600 begins with element 602, where the pattern matching server 110 may receive a request from an e-commerce application 118 to analyze a particular user-browser interaction session. The pattern matching server 110 may, at element 604, determine the user-browser interaction data associated with the current session for which the request was made. In some embodiments, the user-browser interaction data for the current session may be stored in the user-browser interaction database 130, while in other alternative embodiments the user-browser interaction data for the current session may be received from the e-commerce application 118 along with the request.

At element 606, the pattern matching server 110 may access the user-browser interaction data from other sessions of the user (and optionally for the user's particular profile). The user-browser interaction data from previous sessions may also be stored in the user-browser interaction database 130. After accessing the data, the pattern matching server 110 may at element 608 analyze the previous interaction data to determine any patterns in the user-browser interaction. The pattern matching server 110 may then, at element 610, compare the current session user-browser interaction data with the determined patterns to ascertain the similarities and/or differences between the two. Based on the comparison, the pattern matching server 110 may determine the pattern matching score for the current session at element 612 and transmit the pattern matching score to the requesting e-commerce application 118 at element 614, after which the method terminates. By utilizing the method of FIG. 6, the pattern matching server 110 may thus provide pattern matching scores to requesting e-commerce applications 118 for users currently accessing those e-commerce applications 118 horn their specific client computer systems 102.

Figure 7:
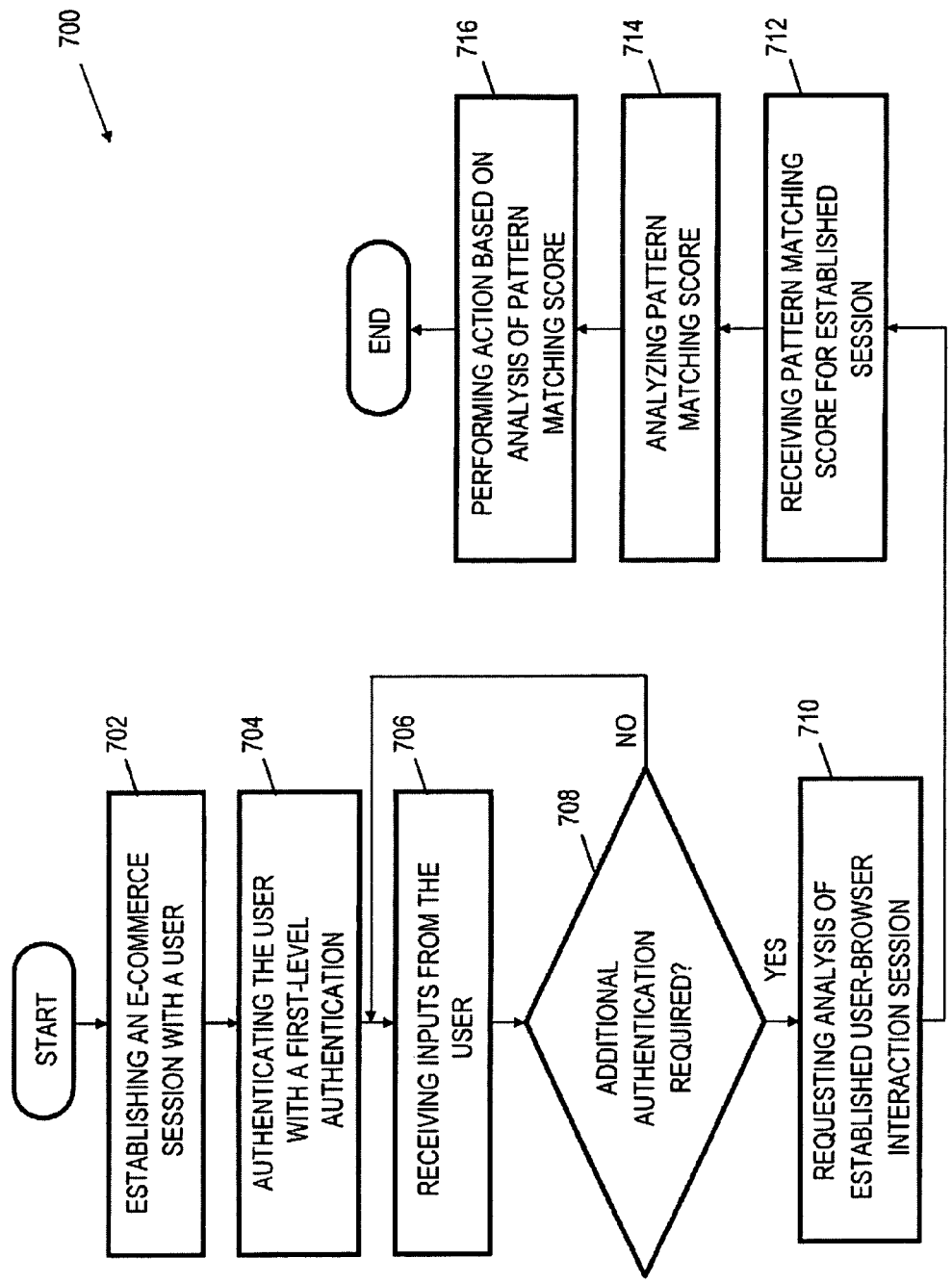
FIG. 7 depicts an example of a flow chart for interacting with a user and authenticating the user with a pattern matching score according to one embodiment.

FIG. 7 depicts an example of a flow chart 700 for interacting with a user and authenticating the user with a pattern matching score according to one embodiment. The method of flow chart 700 may be performed, in one embodiment, by an e-commerce application 118 executing on, for example, an application server 106. Flow chart 700 begins with element 702, where the e-commerce application 118 establishes an e-commerce session with a user. Establishment of a session may typically include authenticating the user with a first-level authentication at element 704. A first-level authentication may be authentication such as a user name and password or any other type of authentication. Alternatively, no first-level authentication is performed (eliminating the need for element 704) and establishment of a user session may require only a user name or other identification.

Once a session is established the e-commerce application 118 may receive inputs from the user at element 706 as part of the normal operation of the e-commerce site. User inputs may include requests for action (e.g., checkout or purchase, request for information, etc.). The e-commerce application 118 may determine at decision block 708 whether additional authentication is required for any action requested by the user. If no additional authentication is required (such as if any first-level authentication is sufficient for the requested action), the method of flow chart 700 returns to element 706 to receive more user inputs. If the e-commerce application 118 determines that additional authentication is required, the pattern matching requester 120 may at element 710 request analysis of the established user-browser interaction session from the pattern matching server 110. The pattern matching requester 120 may make such request in response to a request by the e-commerce application 118 itself. The request for analysis may include an indication of the user (such as a user login) and may optionally include an indication of the user's interaction with the browser 112 during the current session.

After requesting analysis of user-browser interaction for the session, the e-commerce application 118 may receive a pattern matching score for the established session at element 712. The e-commerce application 118 may then, at element 714, analyze the pattern matching score to determine an appropriate course of action with respect to the user and may perform such action based on the analysis of the pattern matching score at element 716, after which the method terminates. The e-commerce application 118 may determine a course of action based on both the requested action by the user and the analysis of the pattern matching score. For example, if a user has requested to purchase goods or services with a credit card, the e-commerce application 118 may request additional authentication before authorizing the purchase. Upon receipt of a favorable pattern matching score (i.e., one indicating a high level of authentication), the e-commerce application 118 may choose to allow the transaction to proceed. Upon receipt of a less favorable pattern matching score indicating a low authentication strength, the e-commerce application 118 may deny the transaction, flag the transaction for later follow-up, request additional information (another form of authentication), request a follow-up phone call, or other action.

It will be apparent to those skilled in the art having the benefit of this disclosure that the present invention contemplates methods, systems, and media for authenticating a user based on analysis of user-browser interaction during an Internet commerce session. It is understood that the form of the invention shown and described in the detailed description and the drawings are to be taken merely as examples. It is intended that the following claims be interpreted broadly to embrace all the variations of the example embodiments disclosed.

What is claimed is:

1. A method for authenticating a user during an e-commerce session, the method comprising the steps of:
    a first computer receiving from a second computer a user identifier and password for a user of the second computer for logging onto an e-commerce session;
    the first computer authenticating the user for the e-commerce session using the user identifier and the password;
    responsive to the step of the first computer authenticating the user, the first computer initiating the e-commerce session for the user;
    during the e-commerce session, the first computer receiving from the second computer user-browser interaction data associated with the e-commerce session, wherein the user-browser interaction data is indicative of one or more of interactions of the user with an e-commerce user interface through which the user interacts during the e-commerce session;
    the first computer receiving, from the second computer, a request for an e-commerce action;
    the first computer accessing existing user-browser interaction data from records of a storage device, wherein said records are indexed against the user identifier, wherein the existing browser interaction data is indicative of one or more interactions of the user with a keyboard or GUI pointer control device in a set of two or more previous e-commerce sessions;
    the first computer comparing behavioral patterns of the user-browser interaction data associated with the e-commerce session against behavioral patterns of the existing browser interaction data from the two or more previous e-commerce sessions;
    the first computer determining a pattern matching score for the e-commerce session based on the comparing; and
    the first computer, responsive to successfully verifying the identity of the user using the pattern matching score, satisfying the request by performing the e-commerce action.

2. The method of claim 1, wherein the first computer is an e-commerce server, and wherein the second computer comprises a Web browser which provides the e-commerce interface through which a human user interacts during the e-commerce session.

3. The method of claim 1, wherein the existing user-browser interaction data comprise data for behavioral patterns of behavioral tendencies of the user in navigating between fields of the e-commerce interface.

4. The method of claim 1, wherein the first computer serves Web pages to a browser of the second computer for the e-commerce session, and wherein said method further comprises the steps of:
    the first computer capturing behavioral biometrics based on user input entered into the Web pages during the two or more previous e-commerce sessions; and
    the first computer creating and storing the existing user-browser interaction data in response to the capturing of the behavioral biometrics, the captured behavioral biometrics for use in verifying the user identity during said e-commerce session.

5. The method of claim 1, wherein the user-browser interaction data received from the second computer comprises results of the second computer executing code that was embedded within one or more Web pages served to the second computer by the first computer, wherein the executing of the code by the second computer produces the user-browser interaction data received from the second computer.

6. The method of claim 1, further comprising the step of:
    the first computer serving browser-renderable pages for an e-commerce Website to the second computer, said browser-renderable pages comprising browser-executable code for capturing behavioral biometrics of the user-browser interaction data associated with the e-commerce session.

7. The method of claim 1, wherein the verifying of the user identity using the user-browser interaction data occurs in a user transparent fashion without providing any indication that the verification is being performed via the e-commerce user interface.

8. The method of claim 1, wherein the e-commerce action is for completing an e-commerce transaction in which the user makes a purchase for a good or service, wherein first computer requires the successful verifying before completion of the e-commerce transaction is allowed.

9. The method of claim 1, wherein the e-commerce action is one that accesses or modifies user-specific information maintained by the first computer for the user for e-commerce sessions, wherein the first computer is an e-commerce server.

10. A method for authenticating a user during an e-commerce session, the method comprising the steps of:
    a first computer serving browser-renderable pages for an e-commerce Website to a second computer with which a user interacts during an e-commerce session, said browser-renderable pages comprising browser-executable code for capturing behavioral biometrics of user-browser interaction data associated with the e-commerce session, wherein user-browser interaction data is generated responsive to the second computer executing the browser-executable code;
    the first computer receiving from the second computer the user-browser interaction data associated with the e-commerce session, wherein the user-browser interaction data is indicative of one or more of interactions of the user with the e-commerce Web site during the e-commerce session;
    the first computer accessing a storage device comprising existing user-browser interaction data for interactions with the e-commerce Website involving the user during previous e-commerce sessions;
    the first computer analyzing the existing user-browser interaction data for one or more patterns, which are compared to patterns in the user-browser interaction data for the e-commerce session to generate a pattern matching score for authenticating the user as being the same human as the one participating in the previous e-commerce sessions.

11. The method of claim 10, further comprising the steps of:

the first computer receiving from the second computer a user identifier and password for a user of the second computer for logging onto the e-commerce session;

the first computer authenticating the user for the e-commerce session using the user identifier and the password, wherein the authenticating of the user based on the pattern matching score verifies whether the user is a human for whom the user identifier relates.

12. The method of claim 10, further comprising the step of:
the first computer, responsive to successfully verifying an identity of the user using the pattern matching score, satisfying a request from the second computer by performing an e-commerce action.

13. The method of claim 12, wherein the e-commerce action is for completing an e-commerce transaction in which the user makes a purchase for a good or service, wherein first computer requires the successful verifying before completion of the e-commerce transaction is allowed.

14. The method of claim 12, wherein the e-commerce action is one that accesses or modifies user-specific information maintained by the first computer for the user for e-commerce sessions, wherein the first computer is an e-commerce server.

15. The method of claim 10, wherein the first computer is an e-commerce server, and wherein the second computer comprises a Web browser which provides the e-commerce interface through which a human user interacts during the e-commerce session.

16. The method of claim 10, wherein the first computer is servers Web pages to a browser of the second computer for the e-commerce session, wherein said method further comprises the steps of:
the first computer capturing behavioral biometrics based on user input entered into the Web pages during one or more previous e-commerce sessions; and
the first computer creating and storing the existing user-browser interaction data in response to the capturing of the behavioral biometrics, the behavioral biometrics for use in verifying user identity during said e-commerce session.

17. A computer program product for authenticating a user during an e-commerce session, the computer program product comprising:
one or more computer-readable tangible storage devices;
program instructions, stored on at least one of the one or more storage devices, to receive at a first computer from a second computer a user identifier and password for a user of the second computer for logging onto an e-commerce session;
program instructions, stored on at least one of the one or more storage devices, to authenticate the user for the e-commerce session using the user identifier and the password;
program instructions, stored on at least one of the one or more storage devices, to, responsive to authenticating the user, initiate the e-commerce session for the user;
program instructions, stored on at least one of the one or more storage devices, to, during the e-commerce session, receive from the second computer user-browser interaction data associated with the e-commerce session, wherein the user-browser interaction data is indicative of one or more of a user's interactions with an e-commerce user interface through which the user interacts during the e-commerce session;
program instructions, stored on at least one of the one or more storage devices, to receive from the e-commerce interface of the second computer, a request for an e-commerce action;
program instructions, stored on at least one of the one or more storage devices, to access existing user-browser interaction data from records of a storage device, wherein said records are indexed against the user identifier, wherein the existing user-browser interaction data is indicative of one or more interactions of the user with a keyboard or GUI pointer control device in a set of two or more previous e-commerce sessions;
program instructions, stored on at least one of the one or more storage devices, to compare behavioral patterns of the user-browser interaction data associated with the e-commerce session against behavioral patterns of the existing browser interaction data from the two or more previous e-commerce sessions;
program instructions, stored on at least one of the one or more storage devices, to determine a pattern matching score for the e-commerce session based on comparing the behavioral patterns of the user-browser interaction data associated with the e-commerce session against the behavioral patterns of the existing browser interaction data from the two or more previous e-commerce sessions; and
program instructions, stored on at least one of the one or more storage devices, to, responsive to successfully verifying the identity of the user using the pattern matching score, satisfy the request by performing the e-commerce action.

18. The computer program product of claim 17, wherein the first computer is a computer that serves Web pages to a browser of the second computer for the e-commerce session, wherein said computer program product further comprises:
program instructions, stored on at least one of the one or more storage devices, to capture behavioral biometrics based on user input entered into the Web pages during the one or more previous e-commerce sessions; and
program instructions, stored on at least one of the one or more storage devices, to create and store the existing user-browser interaction data in response to capturing the behavioral biometrics, the behavioral biometrics for use in verifying user identity during said e-commerce session.

19. The computer program product of claim 17, wherein the user-browser interaction data received from the second computer comprises results of the second computer executing code that was embedded within one or more Web pages served to the second computer by the first computer, wherein the executing of the code by the second computer produces the user-browser interaction data received from the second computer.

20. The computer program product of claim 17, further comprising:
program instructions, stored on at least one of the one or more storage devices, to serve browser-renderable pages for an e-commerce Website from the first computer to the second computer, said browser-renderable pages comprising browser-executable code for capturing behavioral biometrics of the user-browser interaction data associated with the e-commerce session.

* * * * *